United States Patent [19]

Reed et al.

[11] Patent Number: 4,799,696
[45] Date of Patent: Jan. 24, 1989

[54] CHUCK CLOSING MECHANISM FOR AUTOMATIC SCREW MACHINE

[75] Inventors: Charles F. Reed, Fairport; Valery Parker, Pittsford, both of N.Y.

[73] Assignee: Dover Industries, Inc., Hoffman Estates, Ill.

[21] Appl. No.: 139,787

[22] Filed: Dec. 30, 1987

[51] Int. Cl.⁴ .............................................. B23B 31/20
[52] U.S. Cl. ....................................... 279/50; 279/43; 279/57
[58] Field of Search ......................... 279/50, 51, 57, 43

[56] References Cited

U.S. PATENT DOCUMENTS 2,401,071  5/1946  Hillberg .................................. 279/51
2,655,826  10/1953  Goldsby .............................. 279/50 X
3,055,671  9/1962  Lewis et al. ........................... 279/51

Primary Examiner—Gil Weidenfeld
Assistant Examiner—Steven C. Bishop
Attorney, Agent, or Firm—Shlesinger, Fitzsimmons & Shlesinger

[57] ABSTRACT

A pair of spindles are journaled coaxially one within the other in the indexing head of an automatic screw machine, and with the outer spindle disposed to be reciprocated axially between first and second limit positions in which it opens and closes, respectively, a collet which is supported by the inner spindle in the bore of the outer spindle. The outer spindle is urged axially to a collet closing position by a compression spring; and a camming element is rotatably adjustable about the outer spindle between a first position in which it urges the outer spindle axially rearwardly against the resistance of the spring to open the collet, and a second position in which it permits the spring to return the outer spindle to a collet closing position. The spring tension is adjustable by another element which is threaded on the outer spindle.

9 Claims, 1 Drawing Sheet

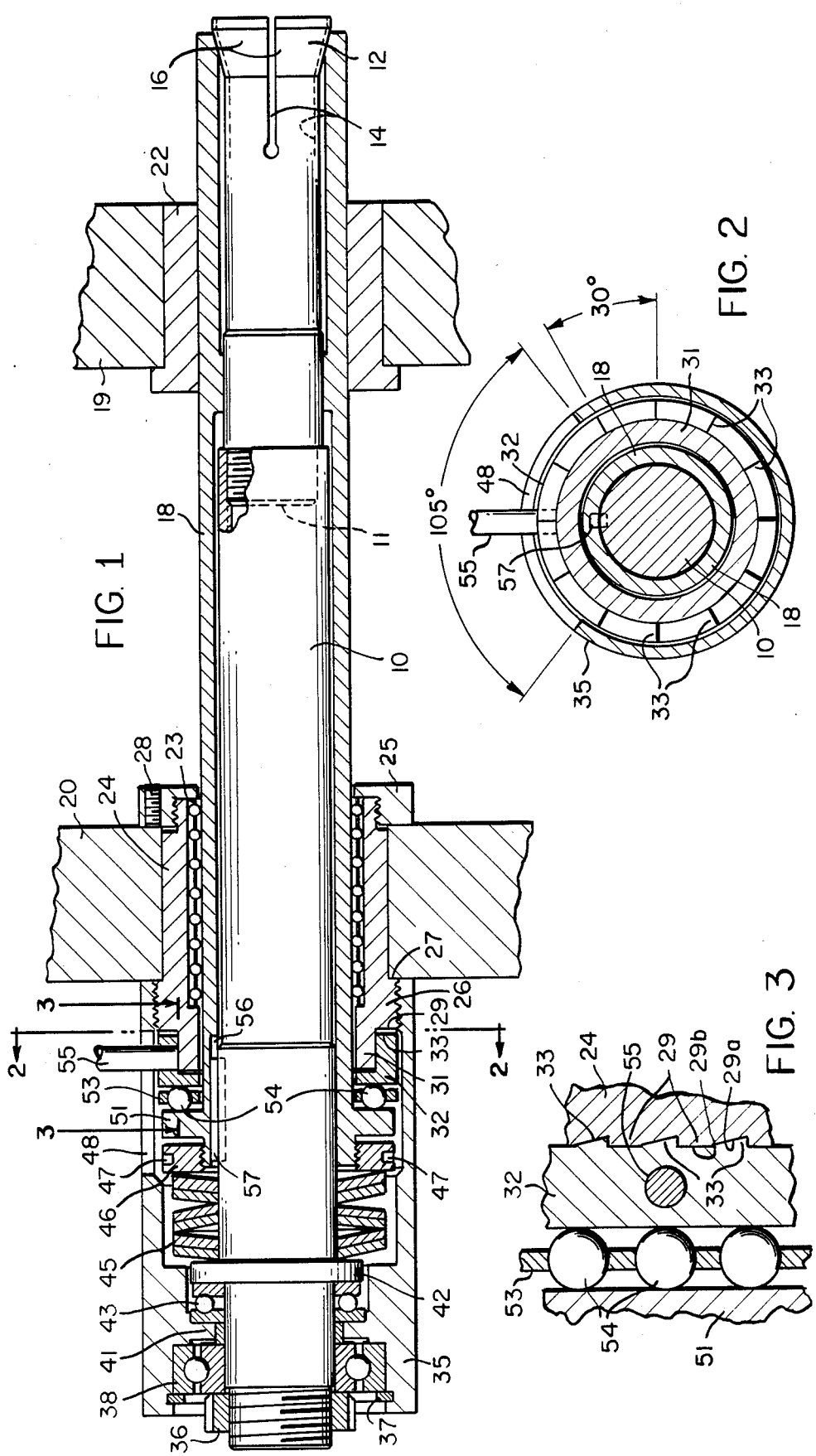

CHUCK CLOSING MECHANISM FOR AUTOMATIC SCREW MACHINE

BACKGROUND OF THE INVENTION

This invention relates to automatic screw machines, and more particularly to an improved mechanism for chucking bar stock in such machines.

In screw machines of the type described a plurality of metal bars (bar stock) are chucked or otherwise releasably secured in rotating, collet-type chucking devices. During a machining operation the forward end of a piece of bar stock is engaged by one or more cutting tools, such as for example threading rolls or the like, after which the machined portion of the stock is cut off from its forward end. The associated chucking device or mechanism is then momentarily opened and the bar stock is fed forwardly again to bring another portion thereof into registry with the associated cutting or threading tools.

U.S. Pat. No. 4,014,558, which is owned by the same assignee as the present application, discloses an automatic screw machine having a chuck operating mechanism that utilizes a plurality of ball bearings, which are movably mounted in a plurality of arcuate pockets or recesses formed in one end of an annular ball cage, which is surrounded by a ball sleeve that is mounted for limited axial reciprocation. When the sleeve is in a retracted position it permits the balls to roll slightly radially outwardly to permit a spring to shift an outer, collet-operating spindle rearwardly to open the associated chucking mechanism. When the sleeve is advanced forwardly it urges the balls radially inwardly against an inclined cam surface which causes the balls to shift the outer spindle axially forwardly in a direction to close the chucking mechanism. In this type of device it is the radial and axial movement of the balls which transmit the opening and closing motion to the collet and chuck operating spindle.

Similar such mechanisms are disclosed in U.S. Pat. Nos. 3,741,572; 2,735,687; 3,176,553; and 4,418,925, except that the latter patent employs, instead of spherically shaped balls, arcuate, generally wedge shaped members, which are mounted for limited radial and axial movement in order to effect opening and closing of an associated collet or chucking mechanism.

The U.S. Pat. Nos. 2,728,579 and 4,171,820 also utilize spherically shaped balls for effecting the opening and closing of a collet or chucking mechanism, but differ from the above-noted prior art patents in that the balls are carried in circular openings in a pivotal operating arm for translational movement by the arm between opening and closing positions. The disadvantage of all of the above-noted prior art devices is that, although in many such mechanisms spherical balls are employed for effecting the opening and closing of a chucking mechanism, the balls are not mounted for simple rotation, but in each case are enclosed within sockets or circular recesses which are utilized to restrain the balls for limited rotational and translational movements. Moreover, in each such case the mechanisms which are employed to retain the balls are rather complicated and extremely expensive to manufacture, assemble, and replace.

It is an object of this invention, therefore, to provide an improved chucking mechanism which, although it utilizes spherical, steel balls for effecting the opening and closing of an associated chucking device, the overall mechanism is substantially more efficient and less complicated to manufacture and assemble.

Still another object of this invention is to provide an improved chuck operating mechanism of the type described which substantially reduces the overall number of parts which are necessary for effecting chucking operations.

Another object of this invention is to provide an improved chucking mechanism which does not require any particular adjustment to its various parts when its associated chucking collet is changed or repaired.

It is an object also of this invention to provide an improved, spring-loaded chucking mechanism which permits relatively simple adjustment of the tension in the associated spring means.

A particular object of this invention also is to provide an improved chucking mechanism which utilizes steel balls for effecting the opening and closing of the associated chucking device, but without utilizing the balls for imparting rotation to any portion of the mechanism.

Other objects of the invention will be apparent hereinafter from the specification and from the recital of the appended claims, particularly when read in conjunction with the accompanying drawings.

SUMMARY OF THE INVENTION

The inner spindle of a chucking mechanism has a collet secured in its forward end, and is surrounded by an outer spindle that is journaled for rotation and limited axial movement in a pair of spaced bearings carried by the spindle indexing head of an automatic screw machine. The rear bearing has a plurality of arcuate, angularly spaced teeth or ramps formed on a circumferential surface thereof that lies in a plane disposed at right angles to the spindle axis. A compression spring which surrounds the inner spindle is engaged at one end with a shoulder on the inner spindle, and at its opposite end with one side of an adjusting ring, which is adjustably threaded onto the outer spindle rearwardly of the teeth formed on the rear bearing. This spring normally urges the outer spindle axially forwardly relative to the inner spindle normally to urge the collet fingers to chuck closing positions around a piece of bar stock.

Mounted for rotatable adjustment on the outer spindle between the adjusting ring and the toothed surface of the rear bearing is an annular camming member, which has formed on one end surface thereof a plurality of arcuate teeth that are positioned in confronting, complimentary registry with the teeth on the rear bearing. The other end surface of the camming member has rolling engagement with a plurality of ball bearings mounted in an annular cage located between the camming member and the spring-adjusting ring.

Secured to and projecting radially outwardly from the camming member through an opening in a surrounding sleeve is an operating lever which can be rotatably indexed between a first position in which the teeth on the camming member mesh with those on the bearing to permit the spring to hold the outer spindle in its forward collet-closing position, and a second position in which the teeth on the camming member slide upwardly on inclined sections of the teeth on the rear bearing, thereby to cause the outer spindle to be forced rearwardly to a collet opening position.

THE DRAWINGS

FIG. 1 is a fragmentary longitudinal sectional view of an improved collet chucking mechanism for a multiple spindle screw machine made according to one embodiment of this invention;

FIG. 2 is a sectional view taken generally along the lines 2—2 in FIG. 1 looking in the direction of the arrows; and FIG. 3 is an enlarged, fragmentary developed view taken generally along the lines 3—3 in FIG. 1 looking in the direction of the arrows, and showing the cooperating parts as they would appear if developed into a linear profile.

PREFERRED EMBODIMENTS OF THE INVENTION

Referring now to the drawings by numerals of reference, 10 denotes an inner, collet supporting spindle having removably threaded in a bore 11 in its forward end the rear end of a conventional, flexible collet or collet chuck 12. Collet 12 has in its forward end a plurality of equally-angularly spaced slots 14 which form on the forward end of the collet a plurality of integral gripping fingers 16. This inner spindle 10 and its collet 12 are mounted coaxially within the bore of an outer, collet-closing spindle or sleeve 18 which, as noted hereinafter, is mounted for rotational and limited axial movement in the spaced walls 19 and 20 of the spindle indexing head of a conventional automatic screw machine.

Adjacent its forward end the outer spindle 18 rotates in the bore of a bronze bearing 22, which is secured in a registering bore in the wall 19 of the indexing head. Adjacent its rear end the outer spindle 18 is rotatably supported in an annular ball bearing 23, which is mounted in a counterbore in one end of an annular bushing 24 that is secured by a nut 25 in a registering opening in the wall 20 coaxially of the forward bearing 22. Adjacent its opposite end bushing 24 has thereon an enlarged-diameter, externally threaded shoulder 26 which has a forward end face 27 that is drawn securely against the adjacent side of wall 20, when the nut 25 is threaded snugly onto the opposite end of the bushing 24 and into engagement with the other side of wall 20. The nut 25 is releasably secured in this position by a set screw 28, which threads through the annular wall of the nut to engage wall 20 and prevent any undesirable rotation of the nut 25 during operation of the equipment. The rear end face of shoulder 26 (the end face remote from face 27) has formed thereon a plurality (twelve in the embodiment illustrated) of arcuate, angularly spaced teeth 29 (FIG. 3), which define a ratchet-type camming surface for a purpose noted hereinafter.

As shown more clearly in FIG. 1, bushing 24 has a reduced-diameter end portion 31, which projects axially beyond its shoulder 26, and coaxially into a counterbore formed in one end of an annular camming member 32. Member 32 is rotatably mounted on end portion 31 of bushing 24, and has formed on its inner or right-hand end face as shown in FIG. 1, a plurality of arcuate, angularly spaced teeth 33, which are disposed in confronting, cooperating relationship to the teeth 29 on bushing 24 for purposes noted hereinafter.

Camming member 32 has an outer diameter slightly less than the outer diameter of the shoulder 26 on the bushing 24, so that it lies coaxially within the bore of an elongate retainer sleeve 35, which is threaded at one end (its right end in FIG. 1) onto the externally threaded shoulder 36 to be supported thereby coaxially of the spindle 18. Secured in a counterbore in the opposite end of sleeve 35 by a nut 36 and a C-ring 37 is a conventional ball bearing 38, the inner race of which surrounds and rotatably supports the end of spindle 10 remote from the collet 12. Surrounding spindle 10 adjacent the bearing 38, and disposed between an internal circumferential shoulder 41 on sleeve 35 and an external circumferential shoulder 42 on spindle 10, is a conventional thrust bearing 43. Also surrounding the spindle 10 in the bore of sleeve 35 for engagement at one end with the shoulder 42 on spindle 10 is a compression spring 45. The opposite end of this spring engages an annular, spring-adjusting element or ring 46, which is threaded onto the terminal end of the outer spindle 18 remote from the collet 12. Ring 46 has in its outer peripheral surface a plurality of angularly spaced sockets or recesses 47, which register with an arcuate, axially extending slot 48 (FIGS. 1 and 2) that is formed in the sleeve 35 intermediate its ends to overlie at one end the ring 46, and at its opposite end the camming member 32. The recesses 47 are adapted to receive an Allen wrench, or the like, that may be used for rotatably adjusting the ring 46 on the spindle 18 thereby to adjust the compression in spring 45.

Adjacent to ring 46 the outer spindle 18 has formed thereon an external circumferential shoulder 51 which is disposed coaxially in the bore of sleeve 35 in axially spaced, confronting relation to the camming member 32. Surrounding spindle 18 in the axial space between the spindle shoulder 51 and the camming member 32 is an annular ball bearing cage 53 which contains a plurality of ball bearings 54 that have rolling engagement at one side with the spindle shoulder 51, and at their opposite sides with the confronting end of the camming member 32. Between its end surfaces the member 32 has secured thereto one end of a lever arm or operating rod 55, the opposite end of which extends outwardly through the slot 48 to the exterior of sleeve 35 so that the camming member 32 can be rotated relative to spindle 18 as noted hereinafter.

Spindle 18, which is disposed to be driven or rotated in a conventional manner by means not illustrated has in its bore adjacent the end thereof remote from collet 12 an axially extending keyway or slot 56. Projecting slidably at one side in slot 56 is an elongate key 57, the opposite side of which is secured in a recess in the inner spindle 10. In this way rotational movement of the outer spindle 18 is transmitted to the inner spindle 10.

However, the outer spindle 18, as previously noted, is also supported for limited axial movement relative to the inner spindle 10. This axial movement is resisted by the spring 45, which tends normally to urge ring 46, and hence the outer spindle 18, axially toward the right in FIG. 1 relative to the spindle 10, and into a chuck-closing position in which its forward end urges the collet fingers 16 radially inwardly into a closed or gripping position over the associated bar stock (not illustrated). In this position the cooperating teeth 29 and 33 on the bushing 24 and camming member 32, respectively, will be disposed in meshing engagement as shown, by way of example, in the developed view shown in FIG. 3.

When it is desired to open the chuck mechanism to permit the collet fingers 16 to expand, the lever 55 is rotated in a direction to cause the teeth 33 on member 32 to slide upwardly along the inclined surfaces 29a (FIG. 3) of the stationary teeth 29 until the tips of teeth 33 register with the flat, upper surfaces 29b of teeth 29. In this position the camming member 32 will have been shifted or urged slightly rearwardly or to the left from its position as shown in FIGS. 1 and 3. This axial movement of camming member 32 is imparted through the balls 54 and the spindle shoulder 51 to spindle 18, so that this spindle also is shifted slightly axially rearwardly against the resistance of spring 45. When the spindle 18 is in this retracted position (not illustrated), the resilient fingers 16 of collet 12 open and permit bar stock to be advanced, after which the lever 55 is once again rotatably indexed slightly angularly about the axis of bushing 24 to cause the teeth 33 to return to the positions as shown in FIG. 3 relative to the teeth 29. This permits the spring 45 to return the outer spindle 18 slightly axially forwardly and back into the position shown in FIG. 1, thereby once again closing the chucking mechanism of collet 12 snugly about the associated bar stock.

From the foregoing it will be apparent that the present invention permits prior art chucking mechanisms of the type described above to be considerably simplified, thus making them less expensive and easier to assemble. Also, the force with which the collet is retained in its closed position by spring 45 can be readily adjusted simply by rotatably adjusting the ring-shaped spring retainer element 46. Moreover, spring 45 is interposed substantially directly between the inner and outer spindles 10 an 18, so that unlike some prior art devices only the single spring 45 is required to provide the necessary chucking force.

Also, it will be noted that spring 45 is in its least stressed position when collet 12 is closed, and is further stressed only while the collet is open. Furthermore, spring 45 rotates with the adjusting ring 46 and spindle 18 so that it is not necessary to employ additional bearings for supporting spring 45 against rotation. Also the balls 54 are free to rotate relative to the camming element 32 and the spindle shoulder 51, and are never relied upon for driving purposes, thus prolonging the life of the mechanism.

While this invention has been illustrated and described in connection with only certain embodiments thereof, it will be apparent that it is capable of still further modification, and that this application is intended to cover such any such modifications that may fall within the scope of one skilled in the art or the appended claims.

We claim:

1. In a chucking mechanism having an inner, collet supporting spindle mounted coaxially in the bore of an outer, tubular spindle for revolving therewith about a common spindle axis, and wherein one of said spindles is mounted for axial reciprocation relative to the other spindle selectively to open and close a collet that is supported against axial movement in the inner spindle, the improvement comprising
    a movable camming member having thereon a camming surface surrounding said spindle axis and slidably engaged with a cooperating, stationary camming surface, said member being mounted for rotation about said spindle axis, and for limited axial movement relative thereto,
    means for rotating said camming member to place its camming surface selectively into at least two different angular positions relative to said stationary camming surface,
    resilient means interposed between said spindles and operative normally to urge said camming surface on said member into one of said two different angular positions, and at the same time resiliently to urge said one spindle axially to a first limit position in which said collet is in its closed position,
    said camming surfaces being operative to shift said camming member axially from a first to a second limit position when said camming surface thereon is rotated from said one to the other of said two angular positions, and
    means for transmitting the axial movement of said camming member to said one spindle thereby to shift said one spindle axially to its other limit position, and against the resistance of said resilient means, and thereby to place said collet in its open position, when said camming surface on said member is rotated to said other of its two angular positions.

2. A chucking mechanism as defined in claim 1, wherein said resilient means comprises
    a compression spring interposed between said spindles, and
    means for adjusting the tension in said spring thereby to adjust the force exerted by said spring on said one spindle.

3. A chucking mechanism as defined in claim 2 wherein said adjusting means comprises an annular member operatively connected to said compression spring and rotatable in opposite directions coaxially about said spindle axis selectively to increase or decrease the tension in said spring.

4. A chucking mechanism, comprising
    a frame,
    a tubular, outer spindle journaled intermediate its ends in said frame for rotation coaxially about its axis, and for limited reciprocation parallel to said axis,
    a tubular housing releasably secured to said frame and surrounding one end of said outer spindle coaxially thereof,
    an inner spindle rotatably journaled adjacent one end thereof in said housing, and projecting at its opposite end coaxially into the bore in said outer spindle,
    a collet secured to said opposite end of said inner spindle and disposed coaxially in the bore of said outer spindle for movement thereby between its open and closed positions when said outer spindle is reciprocated axially from one to the other of its limit positions,
    a compression spring mounted in said housing and operatively interposed between said spindles normally to urge said outer spindle axially into a first limit position in which it closes said collet, and
    an adjustable camming element mounted in said housing for rotation about said axis between at least two different angular positions in one of which it urges said outer spindle axially from said first to its second limit position thereby to open said collet, and in the other of which limit positions it permits said spring to return said outer spindle to its first limit position.

5. A chucking mechanism as defined in claim 4, including a rotatable adjusting element mounted in said sleeve for rotation selectively in opposite directions about said axis selectively to increase or decrease, respectively, the tension in said spring.

6. A chucking mechanism as defined in claim 5, wherein said housing has therein a slot registering with said elements to permit access to said elements from the exterior of said housing to effect rotational adjustment thereof.

7. A chucking mechanism as defined in claim 4, wherein a ring is adjustably threaded on one of said spindles in said housing, and said compression spring is engaged at one end with said ring and at its opposite end with a projection on the other of said spindles whereby the tension in said spring is adjustable by rotating said ring.

8. A chucking mechanism as defined in claim 7, wherein said camming element comprises an annular member mounted in said housing for rotational and limited axial movement relative to said outer spindle, and having on one end face thereof a camming surface having rotational sliding engagement with a stationary camming surface on said frame, and said housing has therein an opening registering with said ring and said annular member to permit adjustment thereof from the exterior of said housing.

9. A chucking mechanism as defined in claim 8, wherein said camming surface on said one end face of said annular member comprises a plurality of angularly spaced, generally tooth-shaped projections arranged in a circumferential path around said spindles, and said stationary camming surface comprises a like plurality of generally tooth-shaped projections arranged in a circumferential path around said spindles in confronting, registering relation with the projections on said annular member.

* * * * *